(12) United States Patent
Bakr

(10) Patent No.: US 11,329,707 B1
(45) Date of Patent: May 10, 2022

(54) COMMUNICATION SYSTEMS, DEVICES, AND METHODS FOR MULTICARRIER FREQUENCY DIVISION DUPLEXING

(71) Applicant: Tarana Wireless, Inc., Santa Clara, CA (US)

(72) Inventor: Omar Bakr, Los Altos, CA (US)

(73) Assignee: Tarana Wireless, Inc., Santa Clara, CA (US)

( * ) Notice: Subject to any disclaimer, the term of this patent is extended or adjusted under 35 U.S.C. 154(b) by 0 days.

(21) Appl. No.: 17/006,649

(22) Filed: Aug. 28, 2020

(51) Int. Cl.
*H04B 7/06* (2006.01)
*H04L 5/14* (2006.01)
*H04B 7/08* (2006.01)
*H04L 5/00* (2006.01)

(52) U.S. Cl.
CPC ......... *H04B 7/0634* (2013.01); *H04B 7/0626* (2013.01); *H04B 7/0891* (2013.01); *H04L 5/0007* (2013.01); *H04L 5/14* (2013.01)

(58) Field of Classification Search
CPC ............................ H04L 5/0007; H04B 7/0613
See application file for complete search history.

(56) References Cited

U.S. PATENT DOCUMENTS

| | | | | |
|---|---|---|---|---|
| 2013/0155912 A1* | 6/2013 | Khojastepour | ....... | H04L 5/0062 370/277 |
| 2019/0386716 A1* | 12/2019 | Uchida | ................ | H04B 7/0452 |
| 2021/0058219 A1* | 2/2021 | Kimura | ................ | H04W 28/02 |

FOREIGN PATENT DOCUMENTS

EP    1005190 A2 *  5/2000

* cited by examiner

*Primary Examiner* — Kevin Kim
(74) *Attorney, Agent, or Firm* — Dorsey & Whitney LLP

(57) ABSTRACT

Examples described herein include examples of wireless communication devices, systems, and methods which may employ multicarrier frequency division duplexing (multicarrier-FDD) techniques. Such techniques may enhance capacity and/or latency of example beamforming and MIMO systems. In some examples, the techniques described herein may be particularly advantageous in fast changing channels. Example channel duplexing techniques and methods described herein may achieve more efficient handling of fast fading channels by space-time adaptive (STAP) and/or adaptive array systems.

21 Claims, 6 Drawing Sheets

US 11,329,707 B1

COMMUNICATION SYSTEMS, DEVICES, AND METHODS FOR MULTICARRIER FREQUENCY DIVISION DUPLEXING

TECHNICAL FIELD

Examples described herein relate to wireless communication systems, devices, and methods. Examples are described including use of multicarrier frequency division duplexing techniques allowing for at least partially temporally simultaneous transmission of uplink and downlink transmissions in a same frequency band. The uplink and downlink transmissions may be provided on different subcarriers in the frequency band.

BACKGROUND

Modern wireless systems have adopted multi-antenna radio architectures to increase capacity in order to cope with the rapidly growing data demand. Many different terms may be used to refer to multi-antenna based systems like beamforming, multi-input-multi-output (MIMO), adaptive arrays, space-time-adaptive processing (STAP) etc. The term STAP may be used herein to refer to these type of systems. STAP systems may generally leverage the spatial domain to scale the overall system capacity (in addition to the time and frequency domains). STAP systems may exploit the spatial domain by using antenna-arrays to dynamically shape beams to maximize and/or improve signal quality while reducing interference power. Even though STAP techniques have proven effective, they face many challenges that limit their scalability in practice.

DETAILED DESCRIPTION

Figure 1:
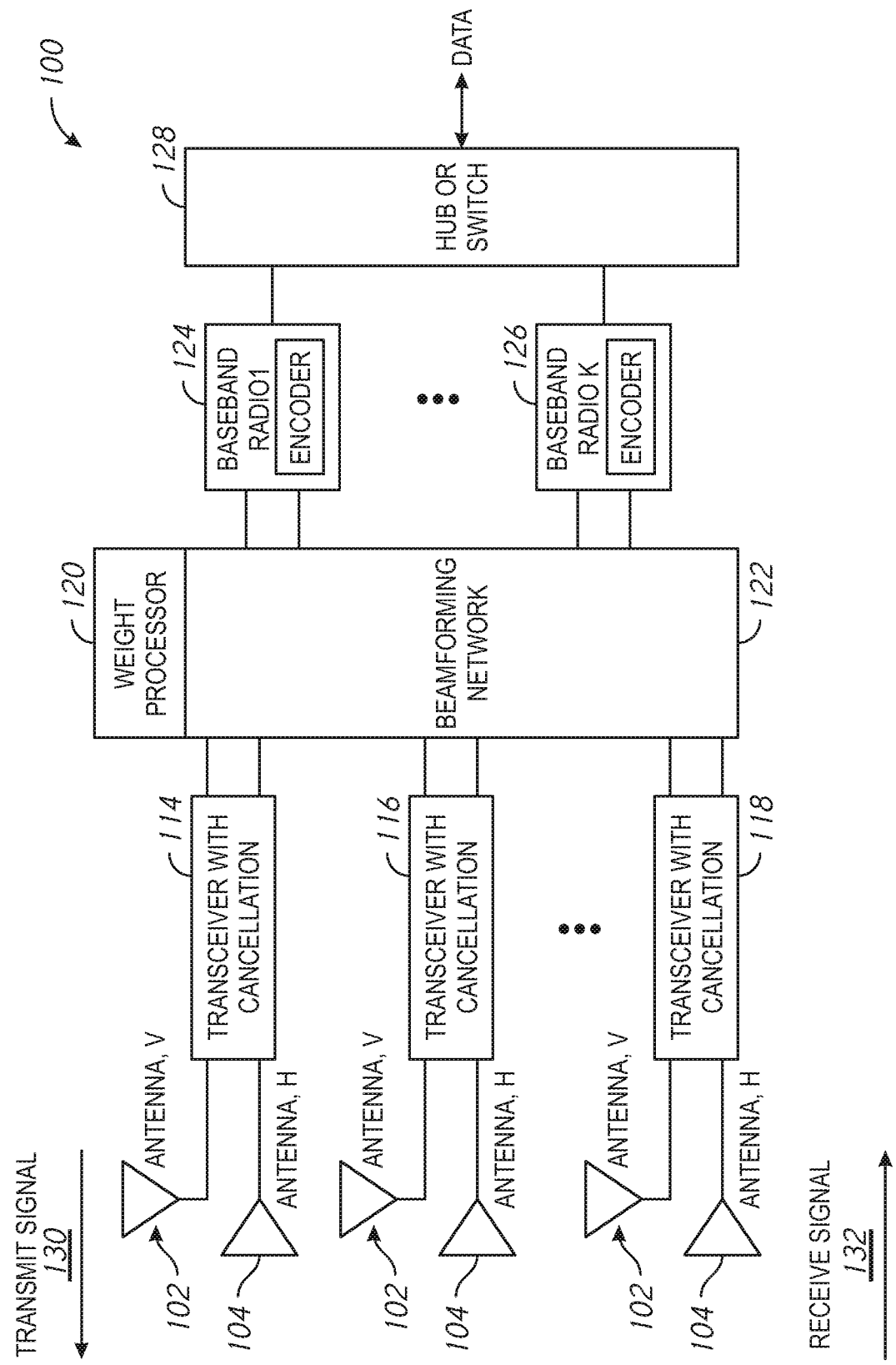
FIG. 1 is a schematic illustration of a system arranged in accordance with examples described herein.

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Examples described herein include examples of wireless communication devices, systems, and methods which may employ multicarrier frequency division duplexing (multicarrier-FDD) techniques. Such techniques may enhance capacity and/or latency of example beamforming and MIMO systems. In some examples, the techniques described herein may be particularly advantageous in fast changing channels. Example channel duplexing techniques and methods described herein may achieve more efficient handling of fast fading channels by space-time adaptive (STAP) and/or adaptive array systems.

STAP systems and techniques face many challenges that limit their scalability in practice. For example, the maximum capacity that can be sustained by a traditional STAP system is proportional to the size of the antenna array (e.g., number of antennas or degrees of freedom). Unfortunately, neither computational complexity nor the training overhead scale well with the size of the array. The computational complexity of optimal or near optimal beamforming weights is proportional to the cube (e.g., third power) of the number of degrees of freedom (DOF), while the training overhead is linearly proportional (e.g., usually 4×) to the number of DOFs.

This may not be an issue in a static system/environment. In a static system (e.g., one where the environment hardly changes), computations/optimizations can be performed very infrequently without any performance penalty, which may render both the computation and communication overhead extremely negligible since they can be completed over longer periods of time. Unfortunately, most wireless systems are highly dynamic, which may bring a lot of other factors into play that further amplify these problems.

In most wireless systems of interest (e.g., mobile cellular, fixed home broadband etc.) the environment (e.g., the channel, including estimates of channel state information) may change very rapidly in both time and frequency. That means that computations and optimizations will generally have to be conducted very frequently in both domains, and completed in in very short periods of time. Training patterns will also desirably be repeated as frequently which ends up eating most of the useful system capacity.

Addressing these challenges impacts many areas in the overall system design, such as algorithm design, frame structure, multiplexing and duplexing techniques. Examples described herein include duplexing techniques which may in some examples improve capacity in fast changing environments (e.g., in systems using channels having channel characteristics which frequently vary). Examples of fast changing environments generally include any of a variety of realistic settings—e.g., user device communication from homes, highways, airplanes, or other vehicles, or communications in multipath environments (e.g., in populated areas, cities, neighborhoods, homes, buildings).

Examples of wireless communication systems described herein include links that are bi-directional (e.g., the two ends of the links both transmit and receive). However, in some examples, uni-directional communication may be used (e.g., radio or television broadcast). The traffic distribution between the two directions can be anywhere from a uniform distribution (e.g., roughly equal amounts of traffic in both directions), as in many P2P and PtP networks, to a uni-directional link, as in TV broadcast. One purpose of many wireless communication systems may be to connect end-users to a core network (e.g. the Internet). Traffic that flows from the core of the network to the end-user is usually referred to as the down-link (DL) or DL traffic, and traffic flowing in the direction (from the end-user to the core) may be referred to as the uplink (UL). There is usually more traffic on the DL than the UL. However, even if most of the content is being pulled from the core network, some Internet protocols like TCP require a minimum UL:DL ratio in order to main good performance on the DL. Typical UL:DL ratios may be 1:3-1:4.

Each direction of the link may utilize separate channel resources. This resource allocation may be referred to as channel duplexing. Channel duplexing may occur in time or in frequency or a combination of both.

Some examples of existing approaches to channel duplexing are briefly described in order to facilitate an appreciation of the drawbacks of existing approaches which may, in some examples, be addressed by example systems, devices, and methods described herein. It is to be understood that not all example systems described herein may address every, or even any, drawback of existing approaches. Rather, the existing approaches are described to facilitate appreciation of examples of techniques described herein.

An example existing approach to separate the DL and UL is to put each on a separate frequency band, also known as frequency division duplexing (FDD). In this manner, both ends of the links transmit and receive simultaneously, which may reduce the link latency. However, FDD has disadvantages. First, channel reciprocity is lost when the DL and UL are on separate frequency channels. STAP algorithms may advantageously take advantage of channel reciprocity. Without channel reciprocity, explicit feedback may be required, which does not scale very well. Moreover, FDD requires spectrum bands to be paired. These bands must have sufficient separation in order to isolate the transmitter and receiver. The closer the bands, the bulkier and more expensive the filters become. Finally, with FDD, the resource allocation is fairly static, and is difficult to change without changing the hardware. This is very restrictive, especially considering traffic patterns may change over time.

Examples of systems, devices, and techniques described herein may advantageously separate DL and UL transmissions not by frequency band, but by subcarrier. In this manner, channel reciprocity may be leveraged, such that antenna weightings calculated based on received signals (e.g., a DL transmission) may be used for a transmitted signals (e.g., a UL transmission). In some examples, the channel information may be considered constant over some or all of the subcarriers in the band of subcarriers used for UL and DL transmission described herein.

Another technique in use in existing systems is time division duplexing (TDD), which may separate the DL and UL by assigning them different non-overlapping time slots. In this manner, only a single frequency channel may be required. Unpaired spectrum is usually much cheaper than paired spectrum. Generally, TDD may preserve TX/RX channel reciprocity, which may be advantageous for STAP systems. Synchronous-TDD may be used in existing cellular systems and some fixed access networks (e.g. WiMAX and TDD-LTE). With asynchronous-TDD, assignments can change in real-time in response to traffic demands. Asynchronous-TDD is used in CSMA based networks (mostly found in PtP networks and those using unlicensed spectrum like WiFi). However, TDD has several drawbacks. Unlike FDD transceivers, TDD transceivers do not require a bulky duplexer/diplexer, which is usually composed of a pair of sharp-cutoff bandpass filters. Instead, they may use an RF switch, which is a lot smaller and cheaper, for transitioning between Tx and Rx. However, the transition between Tx and Rx is not spontaneous. A short time period (guard) must be inserted at every transition between DL and UL (and UL and DL). The minimum length of this period is proportional to the time of flight between the two ends of the link. In addition to the time of flight, the transceiver electronics, especially power amplifiers (PAs), need some time to settle to a steady state. These time guards add to the overall PHY overhead. This extra overhead can be reduced by increasing the frame size, which makes the time guards a smaller fraction of the frame (however, the weights per frame would be therefore be computed less frequently and may become stale). Another drawback of TDD is latency. Since a node in a TDD system does not transmit continuously, the data will incur some delay between transmits. The delay becomes worse as the frames become longer. So there is a tradeoff between latency and overhead. Also, latency due to TDD framing adds up in a multihop link, which is why TDD is rarely used in more than a few hops. TDD systems, especially synchronous TDD, typically uses global network timing synchronization in order to avoid co-channel and adjacent channel interference. This is usually achieved by either synchronizing over the GPS or wired network.

Accordingly, both TDD and FDD systems have benefits and drawbacks. Hybrid approaches can also be used to bridge the gap between the two different schemes and bring the benefits of both worlds. There are several ways combine both TDD and FDD in order to address the existing shortcomings in some examples. For example, reference symbols may be injected between FDD frames. The reference symbols force each transmitter to briefly go into receive mode in order to learn the channel response and compute the transmit beamforming weights. The additional latency that is incurred in this framing structure is the total length of the reference symbols plus TTG+RTG. Unlike conventional TDD, the latency independent of the frame length. However, the additional latency is also additional overhead. The overhead can be reduced in some examples by increasing the frame size up to the coherence time of the channel. Another limitation of this scheme is that the training of the Tx weights is limited to the reference symbols. That means that pilots, control blocks, and payload data (e.g., decision direction) cannot be used in the STAP. This limits the achievable time-bandwidth product (TBP), referring to the minimum amount of training data by the array/beamformer in order to meet the desired performance requirements, for the Tx weights, without increasing the overhead.

Another method to combine TDD and FDD may be to use two TDD channels operating side by side. The two channels, however, generally, do not operate independently. Instead, when one channel is in Tx mode, the other will be in Rx mode and vice-versa. In these examples, also referred to as dual-TDD, the TBP of the Tx weights may no longer be an issue since the Tx STAP weights are computed from the same training data as the Rx STAP weights in the same band. Latency may be no longer dependent on the frame size. The additional latency (relative to conventional FDD) is the length of the time guard periods. This additional overhead can be made smaller by increasing frame size up to the coherence time of the channel.

In both these hybrid approaches, note that the DL and UL always have the same bandwidth even if the traffic patterns are not symmetric. The symmetry issue can be addressed in some examples with a hybrid dual-TDD/conventional TDD tri-band solution. Two of the three bands are used in dual-TDD mode, while the third band may be used in conventional TDD mode. The conventional TDD is used to control the DL/UL channel allocations, and mostly for delay tolerant traffic, while the dual-TDD is used to low-latency traffic.

While these hybrid techniques may begin to address several short-comings of both TDD and FDD in some examples, they do not address all challenges related to STAP, such as those that relate to fast channel variations. Examples of systems, devices, and methods described herein which employ multicarrier-FDD may provide a different solution that may be more advantageous in a fast channel environment.

One factor which may limit available TBP is continuous variation in the wireless channel. When channels vary very rapidly, signals/data used for training may become stale very quickly. The channel variation rate generally places an upper bound on the maximum achievable capacity. Mobile networks are the fastest growing segment of not only wireless networks, but all networks. The demand for mobile data is growing exponentially. Therefore, improving the existing system architecture to enable beamforming systems to scale and perform better under mobility and dynamic channel may be advantageous. Examples described herein include new duplexing techniques that may facilitate beamforming systems to achieve better scalability under dynamic channels.

FIG. 1 is a schematic illustration of a system arranged in accordance with examples described herein. The system 100 includes multiple transceivers including cancellation circuitry—including transceiver with cancellation 114, transceiver with cancellation 116, and transceiver with cancellation 118. Each transceiver is depicted with two antennas. The transceiver with cancellation 114 is connected to antenna 102 and antenna 104. The transceiver with cancellation 116 is connected to antenna 106 and antenna 108. The transceiver with cancellation 118 is connected to antenna 110 and antenna 112. The transceivers are connected to beamforming network 122. The beamforming network 122 includes weight processor 120. Multiple baseband radios are connected to beamforming network 122—including baseband radio 124 and baseband radio 126. The baseband radios are depicted as including encoders, and the baseband radios may additionally or instead include decoders. The baseband radios are connected to switch 128 which may provide and/or receive data. The components shown in system 100 of FIG. 1 are exemplary. Additional, fewer, and/or different components may be used in other examples.

Examples of systems described herein, such as system 100 of FIG. 1, may be incorporated into and/or otherwise used to implement one or more wireless communication devices. Examples of wireless communication devices include base stations, routers, access points, cells, computers (e.g., servers) as well as mobile devices such as tablets, handsets (e.g., cellular phones), and laptops. Examples of wireless communication devices further include other devices having incorporated communication technology such as televisions, set-top boxes, gaming devices, home automation devices, appliances, and automobiles or other vehicles. Multiple systems described herein, including multiple instances of system 100 of FIG. 1, may be deployed in a communication environment. For example, the system 100 may be used to implement one or more mobile communication devices (e.g., handsets) which may communicate with one or more base stations in a communication environment, where the base stations may also include an example system described herein (e.g., system 100 of FIG. 1).

Examples of systems described herein include transceivers (e.g., wireless communication transceivers), such as transceiver with cancellation 114, transceiver with cancellation 116, and transceiver with cancellation 118 of FIG. 1. Transceivers generally may include both transmitter and receiver components and/or share circuitry used to perform transmitting and receiving. In some examples, a transceiver may include separate transmitter and receiver components. While three transceivers are provided with reference numbers in FIG. 1, any number may be included in the system (as indicated by the three dots in FIG. 1). For example, 1, 2, 3, 4, 5, 6, 7, 8, 9, 10, 16, 32, 64, 128, and/or other numbers of transceivers may be used in other examples. While transceivers in FIG. 1 are labeled as including cancellation circuitry, in some examples, transceivers without cancellation circuitry may be used.

Examples of transceivers may be connected to antennas. For example, transceiver with cancellation 114 is depicted connected to antenna 102 and antenna 104. Transceiver with cancellation 116 of FIG. 1 is depicted connected to antenna 106 and antenna 108. Transceiver with cancellation 118 of FIG. 1 is depicted connected to antenna 110 and antenna 112. Generally, multiple antennas connected to a single transceiver may each be used to (e.g., tuned to) receive a particular polarization (e.g., indicated by 'Antenna V' and 'Antenna H' in FIG. 1. In some examples, one or more transceivers may be connected to only a single antenna.

The system 100 may include one antenna and/or may include multiple antennas—e.g., the system 100 may be a multiple antenna system, otherwise referred to as a multiple-input multiple-output (MIMO) system. In this manner, any number of antennas may be provided in systems described herein, such as 1, 2, 3, 4, 5, 6, 7, 8, 9, 10, 16, 32, 64, 128, 256, or other number of antennas. Multiple antennas provided in a system (e.g., in a mobile communication device) may be referred to as an antenna array. The antenna array may be local to one device (e.g., the antennas may be provided in a same device), or the antenna array may be distributed in some examples. For example, the antennas shown in FIG. 1 may be included in separate devices distributed about an environment in some examples. Transceivers in communication with the distributed antennas may be in communication with one another and/or with a beamforming network to facilitate techniques described herein.

The antennas may be used to provide transmit signals such as transmit signal 130 and receive signals, such as receive signal 132. Generally, uplink transmissions may generally refer to communications provided to a device that may be closer to a network hub or switch for providing data to a central network (e.g., the Internet), while downlink transmissions may generally refer to communications provided from the central network (e.g., the Internet) to other devices (e.g., mobile devices). Accordingly, some devices (e.g., mobile devices) may transmit uplink transmissions as receive downlink transmissions, as is generally depicted in FIG. 1. However, some devices (e.g., base stations) may transmit downlink transmissions and receive uplink transmissions. Accordingly, the transmit signal 130 may be an uplink transmission in some examples and a downlink transmission in other examples. The receive signal 132 may be an uplink transmission in some examples and a downlink transmission in other examples.

In examples described herein, outgoing transmissions from antennas of a system may be provided using one set of subcarrier frequencies (e.g., uplink subcarrier frequencies) while incoming transmissions received at antennas of the system may be received at a different set of subcarrier frequencies (e.g., downlink subcarrier frequencies). The sets of subcarrier frequencies may be distinct—e.g., all the uplink subcarrier frequencies may be different than any of the downlink subcarrier frequencies in some examples. In this manner, incoming and outgoing transmissions (e.g., uplink and downlink transmissions) may be separated in frequency. Transceivers described herein may include one or more filters, which may allow signals in the uplink and/or downlink subcarrier frequencies to be separated from incident signals. In some examples the number of subcarriers used to transmit signals may be the same as the number of subcarriers used to receive signals (e.g., the number of uplink and downlink subcarrier frequencies may be equal). However, in some examples, a greater number of subcarriers may be devoted to uplink and/or downlink transmissions. Accordingly, in some examples, the number of subcarriers used for uplink transmissions may be different than the number of subcarriers used for downlink transmissions. Transceivers described herein may include one or more analog-to-digital and/or digital-to-analog converters.

Examples of transceivers described herein may include cancellation circuitry—such as transceiver with cancellation 114, transceiver with cancellation 116, and transceiver with cancellation 118 of FIG. 1. Cancellation circuitry may be used to cancel interference present in radiation incident on one or more of the antennas connected to the transceiver. Cancellation circuitry may be particularly advantageous in examples where uplink transmissions and downlink transmissions are provided at least partially temporally simultaneously by multiple antennas and/or multiple devices in a system. The cancellation circuitry may be used to reduce and/or remove noise from the signal incident on one or more antennas. In some examples, the cancellation circuitry may be used to reduce and/or eliminate self-interference—e.g., remove the signal being transmitted by the antenna (e.g., an uplink signal) so as to recover the portion of incident energy at that antenna which may be nominally associated with a signal intended to be received by the antenna (e.g., a downlink signal). In some examples, the cancellation circuitry may be used to reduce and/or eliminate mutual interference—e.g., remove a signal being transmitted by other antennas of the device (e.g., uplink signals) so as to recover the portion of incident energy at that antenna which may be nominally associated with a signal intended to be received by the antenna (e.g., a downlink signal). In some examples, cancellation circuitry provided with the transceivers may include an analog portion and a digital portion (e.g., analog cancellation circuitry and digital cancellation circuitry). Accordingly, interference cancellation circuitry may at least partially cancel interference at each antenna used to receive signals. The interference may be due to a portion of the transmit signals provided by that same antenna. In some examples, interference cancellation circuitry may at least partially cancel interference at each antenna used to receive signals, where the interference is due to other antennas used to provide the transmit signals.

Examples of systems described herein may include a beamforming network, such as beamforming network 122 of FIG. 1. The beamforming network may be used to provide the signal to be transmitted by each of the multiple transceivers and/or antennas of the system (e.g., system 100 of FIG. 1). The beamforming network may additionally or instead be used to combine signals received at multiple antennas to form a received signal. The beamforming network 122 may include a weight processor 120, which may be used to calculate weights for each of the transceivers and/or antennas in the system. Generally, beamforming networks may be implemented using one or more processors (e.g., central processing unit(s) (CPUs), microprocessors etc.), and/or circuitry for performing computations (e.g., field programmable gate array (FPGA) circuitry and/or application specific integrated circuits (ASICs)).

Training can be a challenge for a beamforming system. In some examples, there may be up to four beamformers provided per link or stream, e.g., two Tx and two Rx. For example, the beamforming network 122 may include four beamformers for each data stream to be handled by the system. In some examples, the beamformers may be replicated for each subband in a stream. The performance of the system is related to the performance of the beamformers, which are trained to generate accurate weights for providing the transmit signals to the individual antennas and/or to combine the receive signals from multiple antennas. Training generally utilizes known or expected data sequences transmitted and/or received in order to select weights for the antennas that accurately transmit and/or receive the known sequences. Transmitting and/or receiving such known training sequences, however, may impact the bandwidth and capacity of the system. Accordingly, examples described herein may provide training while minimizing and/or reducing the overhead that would otherwise be used to transmit actual (useful) data. Training is generally a challenge for both Rx and Tx beamformers. However, it may be a bigger challenge for Tx beamformers since implicit feedback may not be readily available. Since the beamformers are interdependent, a lot of techniques for Tx beamforming are going to be dependent on what happens on the Rx side.

Beamforming networks described herein and utilized in devices and/or systems herein may include one or more weight processors, such as weight processor 120 of FIG. 1. The weight processor 120 may be used to calculate weights to be used by beamforming network 122 to generate signals for transmission by multiple antennas in the system 100 and/or to combine signals received by multiple antennas in the system 100. Generally, the weights may be associated with an estimate of channel state information (CSI) of a channel between the system 100 and another communication device with which the system 100 is in communication or intended to be in communication (e.g., the channel between the other communication device and the antenna array of system 100). Advantageously, in examples described herein, the weight processor 120 may determine (e.g., calculate) weights for the antennas using signals received by the antennas, which may include one or more training symbols or other data used to calculate the weights. In examples described herein, receive signals incident on the antennas may be in a plurality of subcarrier frequencies (e.g., downlink subcarrier frequencies). Signals to be transmitted by the antennas may be transmitted in a different plurality of subcarrier frequencies (e.g., uplink subcarrier frequencies). However, the uplink and downlink subcarrier frequencies may be co-located in a particular carrier band over which the same antenna weights may be used (e.g., the channel characteristics, such as the channel state information, of a channel between the system 100 and another device with which the system 100 is communicating may be said to be the same at the uplink and downlink subcarrier frequencies). In some examples, the same weights may be used over a portion of the subcarrier frequencies having constant channel characteristics (e.g., sufficiently constant that the same weights may be used). The same weights may be used for transmission of signals and receipt of signals on multiple subcarriers within a carrier band generally when the subcarriers within the carrier band are associated with a same estimate of channel state information. Accordingly, the weight processor 120 may calculate weights used to process incoming signals incident on the antennas (e.g., downlink transmissions), and utilize the same weights to transmit outgoing signals using the antennas (e.g., uplink transmissions). In this manner, the weight processor 120 may not need to calculate separate weights for incoming and outgoing transmissions.

Examples of systems described herein include one or more baseband radios, such as baseband radio 124 and baseband radio 126 of FIG. 1. The baseband radios may modulate data intended for transmission by the system and/or de-modulate data intended for receipt of the system. The baseband radios may accordingly include one or more encoders and/or decoders (although only encoders are depicted in FIG. 1). Although two baseband radios are depicted in FIG. 1, any number may be used. The baseband radios may modulate data to be transmitted into the subcarrier frequencies used by the system 100 for transmitting (e.g., the uplink subcarrier frequencies). The baseband radios may demodulate signals received from subcarrier frequencies used by the system 100 for receiving (e.g., the downlink subcarrier frequencies) into data. Any of a variety of schemes may be used by the baseband radios to modulate and/or demodulate the data. For example, orthogonal frequency division multiplexing (OFDM) techniques may be used to modulate data into the uplink subcarrier frequencies and/or demodulate data form the downlink subcarrier frequencies (or vice versa). In some examples, even subcarriers may be zeroed out in downlink transmissions while odd subcarriers are zeroed out in uplink transmissions (or vice versa). In that manner, the downlink and uplink transmission would have no overlap in the frequency domain.

In addition to utilizing subcarrier frequency division duplexing, where uplink and downlink transmissions are provided in different subcarriers within a carrier band, in some examples, systems and methods described herein may additionally utilize time division duplexing techniques. For example, in addition to being present in different subcarriers, in some examples all or particular portions of uplink and downlink transmissions may be temporally separated. Examples of systems described herein may include a switch (e.g., a hub), such as switch 128 of FIG. 1. The switch 128 may provide data to and/or receive data from the baseband radios, such as baseband radio 124 and baseband radio 126 of FIG. 1. In this manner, data may be provided from a data source (e.g., computer, memory, sensor, network) for transmission by the system 100, and data may be provided to the network or other data-consuming device (e.g., computer, memory, actuator) by the system 100 through the switch 128.

Examples of systems and methods described herein accordingly implement a duplexing scheme which may allow a STAP system to take full and/or improved advantage of channel reciprocity, which may address in some examples one or more significant challenges/drawbacks of FDD, TDD, and ADD.

Examples described herein may utilize self-interference cancellation techniques to implement full duplexing or any division duplexing (ADD). ADD may allow a radio transceiver to transmit and receive at the same time on the same frequency channel. With ADD/full-duplexing, any newly estimated Rx weights may be used immediately and/or with a modest amount of delay by the Tx beamformer with little or no latency. Therefore, the Tx weights can be estimated using either implicit (channel reciprocity) or explicit feedback or a combination of both with little or no delay.

Figure 2:
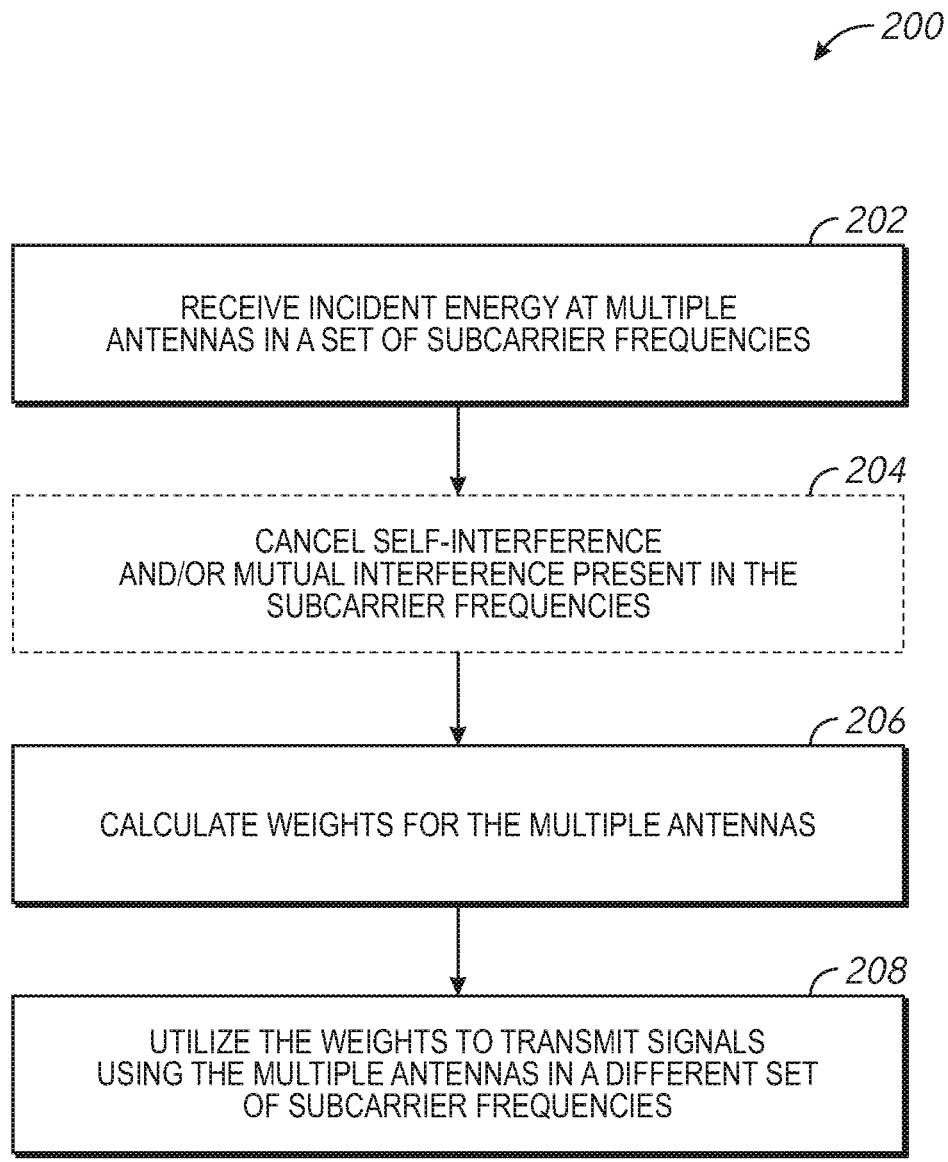
FIG. 2 is a flowchart of a method arranged in accordance with examples described herein.

FIG. 2 is a flowchart of a method arranged in accordance with examples described herein. The method 200 includes block 202, block 204, block 206, and block 208. Block 202 recites "receive incident energy at multiple antennas in a set of subcarrier frequencies." Block 204 may follow block 202; block 204 recites "cancel self-interference and/or mutual interference present in the subcarrier frequencies." Block 206 may follow block 204; block 206 recites "calculate weights for the multiple antennas." Block 208 may follow block 206; block 208 recites "utilize the weights to transmit signals using the multiple antennas in a different set of subcarrier frequencies." Additional, fewer, and/or different blocks may be used in other examples, and the order of blocks may be changed and/or the performance of the blocks may overlap in some examples. The method of FIG. 2 may be performed by the system 100 of FIG. 1 in some examples.

At block 202, incident energy (e.g. radio frequency (RF) signals) may be received at multiple antennas. The incident energy may include energy in a set of subcarrier frequencies intended for use in transmitting either an uplink or downlink transmission. For example, the antennas of system 100 of FIG. 1 may receive incident energy in a set of downlink subcarrier frequencies. The incident energy may represent a downlink transmission which may be provided from another communication device (e.g., from a user device).

At block 204, self-interference and/or mutual interference present in the set of subcarrier frequencies intended to be received may be cancelled. The cancellation may be total and/or may be partial. Referring to FIG. 1, the transceivers shown in FIG. 1 may include cancellation circuitry which may perform the cancellation at block 204. The transceiver with cancellation 114, for example, may receive energy incident on antenna 102. The transceiver with cancellation 114 may cancel interference due to simultaneous or near in time transmissions from antenna 102 (e.g., self-interference). The transceiver with cancellation 114 may additionally cancel interference due to simultaneous or near in time transmissions from other antennas in system 100 (e.g. Antenna 104, antenna 106, antenna 108, antenna 110, referred to as mutual interference).

At block 206, weights may be calculated for the multiple antennas. For example, the weight processor 120 of FIG. 1 may calculate weights using signals received from the depicted antennas. The weights may refer to weightings of the signals from the multiple antennas which may be combined by the beamforming network 122 in accordance with the weights to yield a received signal. The weights may be calculated by selecting weights which are able to produce a received signal containing the intended data. In some examples, training data (e.g., training sequences) may be provided in a communication signal. The weights may be calculated using these training sequences, which may be known to the weight processor 120 in some examples. Training may occur frequently in systems described herein. Generally, training may be used to generate a new set of weights, and training may occur as frequently as desired to keep up with changes in the communication channel. In multipath environments with moving objects, such channel changes may be frequent, and frequent training may be used in some examples. Accordingly, weight computation may be computationally expensive and frequent. Examples described herein may reduce the amount of computation time and expense needed to conduct an adequate amount of training because of the frequency division duplexing techniques that may be employed.

At block 208, the weights are used to transmit signals from the multiple antennas in a different set of subcarrier frequencies. In the example of FIG. 1, the different set of subcarrier frequencies is used to transmit an uplink transmission. The set of subcarrier frequencies used to receive and the set of subcarrier frequencies used to transmit may be different, such that uplink and downlink communications may be separated at a receiver using, e.g., a frequency filter. However, the set of subcarrier frequencies used to receive and the set of subcarrier frequencies used to transmit may be located within a same carrier band such that the same weights may be used for transmit and receive. In this manner, weights calculated during the receive operation may be re-used to provide transmissions, reducing a need to calculate new weights. The weights may be used to transmit by specifying a weight for each transmitting antenna. A transmission signal may be divided into transmissions for multiple antennas in accordance with the weights.

Figure 3:
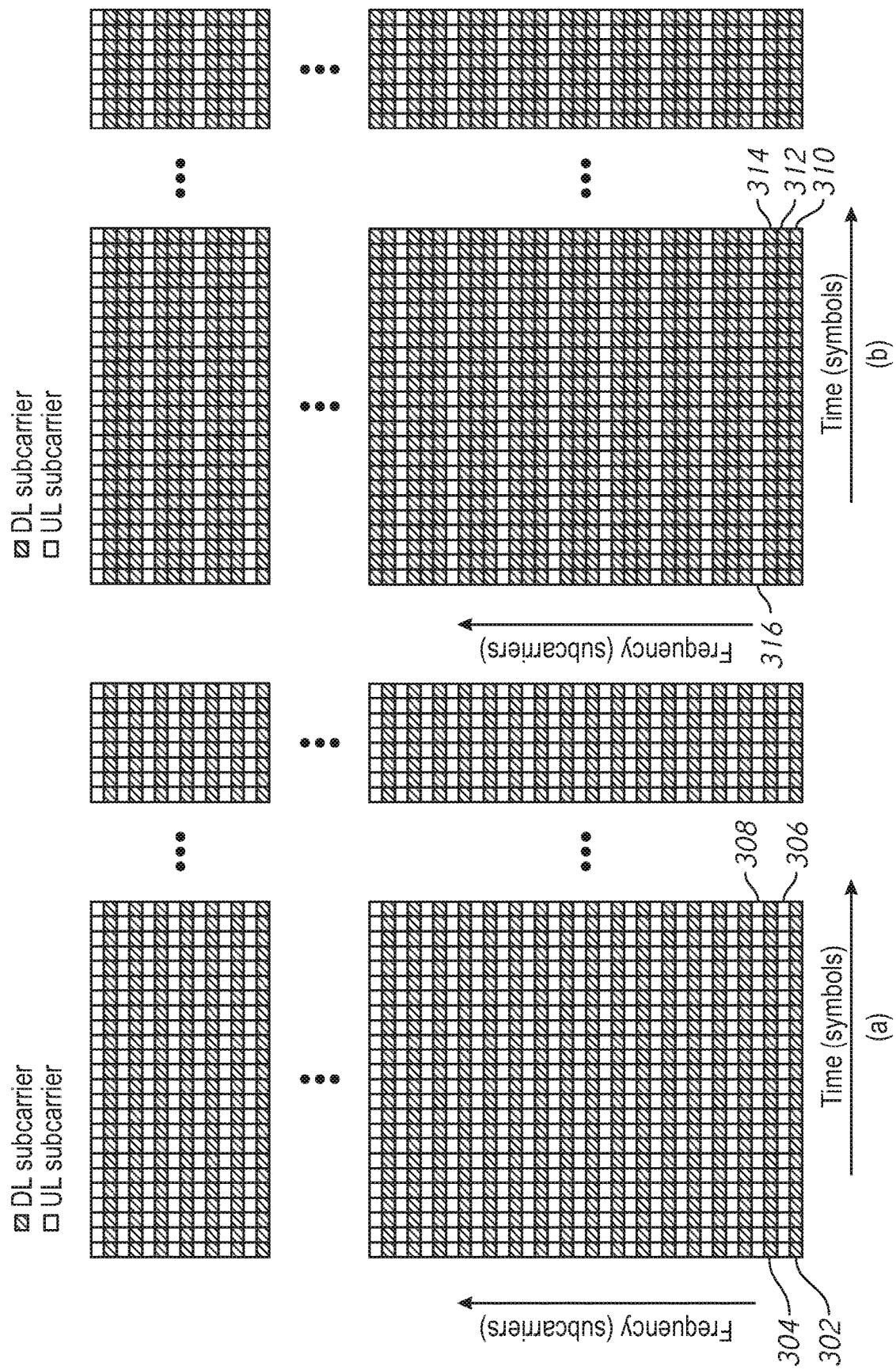
FIG. 3 is a schematic illustration of transmissions arranged in accordance with examples described herein.

FIG. 3 is a schematic illustration of transmissions arranged in accordance with examples described herein. FIG. 3A illustrates a transmission in which an equal number of subcarriers have been allocated for uplink transmissions and downlink transmissions. FIG. 3B illustrates a transmission in which three times as many subcarriers have been allocated for downlink than uplink. Other ratios between subcarriers allocated for downlink versus subcarriers allocated for uplink are also possible. FIG. 3A illustrates an equal number of subcarriers carrying downlink transmission (slashed boxes) and uplink transmissions (open boxes). FIG. 3A includes subcarrier 302 and subcarrier 304 carrying downlink transmissions and subcarrier 306 and subcarrier 308 carrying uplink transmissions. The transmissions of FIG. 3A may be transmitted and received by the system 100 of FIG. 1, for example. For example, the beamforming network 122 and the baseband radio 124 and baseband radio 126 may be used to provide downlink transmissions in subcarrier 302 and subcarrier 304 and uplink transmissions in subcarrier 306 and subcarrier 308.

FIG. 3B provides an example where the ratio between subcarriers for downlink transmissions and subcarriers for uplink transmissions is 3:1. For example, subcarrier 310, subcarrier 312, and subcarrier 314 are used to provide downlink transmissions while subcarrier 316 is used to provide uplink transmissions. The beamforming network 122, baseband radio 124, and baseband radio 126 of FIG. 1 may be used to generate the transmissions shown in FIG. 3B in some examples. The number of subcarriers used for downlink: number of subcarriers used for uplink ratio can be controlled in some examples by assigning different number of subcarriers to the DL relative to the UL.

Other ratios of number of subcarriers used for downlink transmissions versus number of subcarriers used for uplink transmissions may be used in other examples.

FIG. 3A and FIG. 3B illustrate time on the x axis and subcarriers on the y axis. Accordingly, note that uplink and downlink transmissions (e.g., symbols) may be provided at simultaneous and/or overlapping times, albeit at different subcarrier frequencies.

While the transmit and receive signals are shown in distinct frequency bands in FIG. 3, in some examples, the frequency bands may partially overlap. In some examples, the transmit and receive signals may additionally be separated in time, while in some examples, the transmit and receive signals may be transmitted in overlapping and/or the same time slots.

Figure 6:
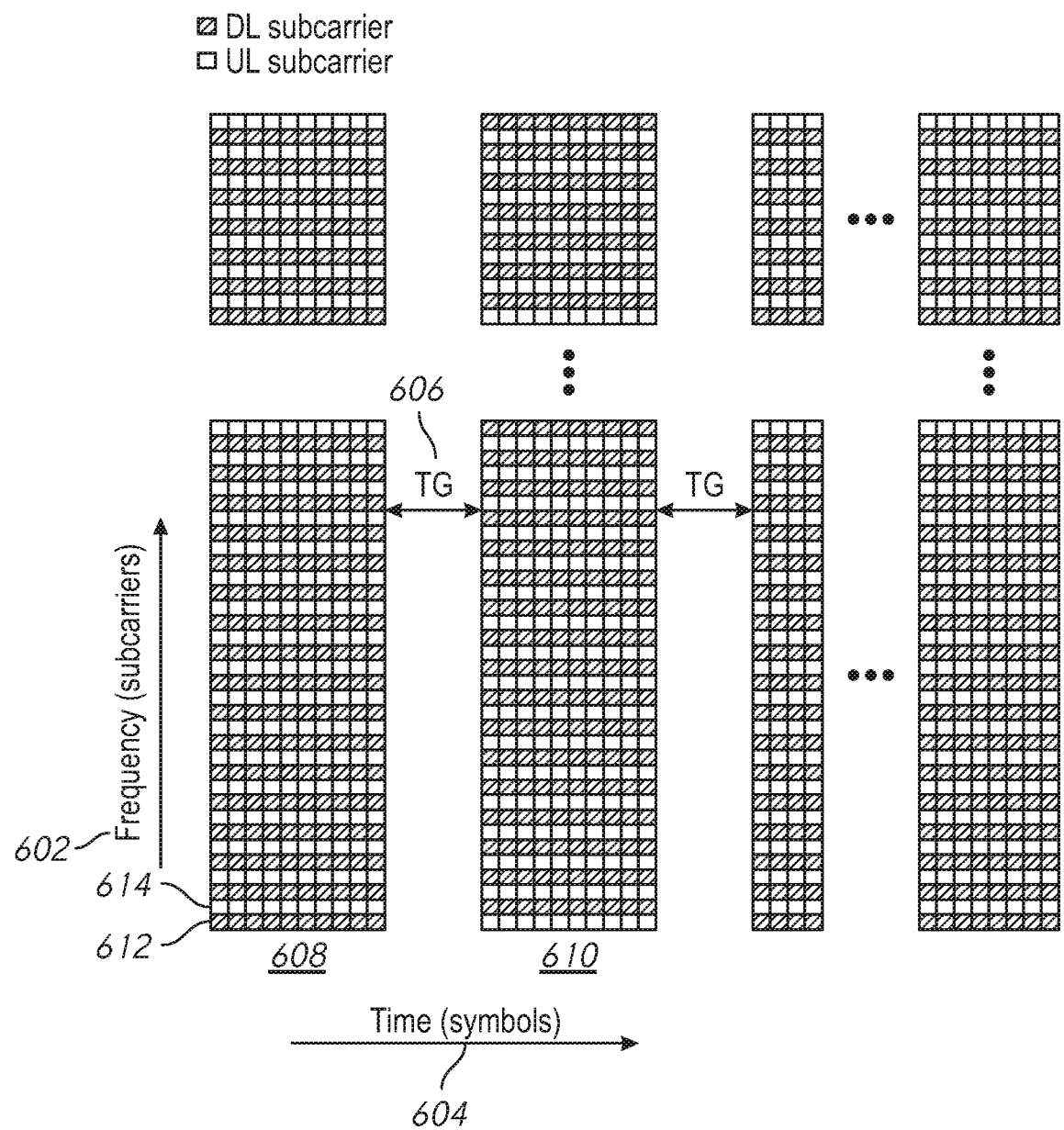
FIG. 6 is a schematic illustration of transmissions arranged in accordance with examples described herein.

FIG. 6 is a schematic illustration of transmissions arranged in accordance with examples described herein. The example of FIG. 6 illustrates frames where both frequency division and time division duplexing techniques may be used. The example of FIG. 6 illustrates multiple frames, including fame 608 and 610. Frequency axis 602 and time axis 604 are shown. Open boxes are shown for uplink transmissions, such as uplink transmissions shown in subcarrier 614. Slashed boxes are shown for downlink transmissions, such as in subcarrier 612. While two frames are numbered in FIG. 6, any number of frames may be used. The frames may be separated in time by a time guard (e.g., time guard 606 in FIG. 6).

In an analogous manner as described with reference to FIGS. 3A, and 3B, transmissions within a frame may have different subcarriers allocated for uplink and downlink. For example, in the frame 608, the subcarrier 612 may be used for downlink transmissions while the subcarrier 614 may be used for uplink transmissions. In the example of FIG. 6, the transmissions allocated to a particular subcarrier may change over time (e.g., from frame to frame). So, for example, in the frame 610, the subcarrier 612 may be used for uplink transmissions while the subcarrier 614 may be used for downlink transmissions. In some examples, multiple frames may utilize one allocation followed by a second set of frames using another allocation. In some examples, the allocation may switch each frame. In some examples, the allocation may switch mid-frame. In an analogous manner to FIGS. 3A and 3B, the number of subcarriers allocated to uplink and downlink may vary. The number of subcarriers allocated to uplink and downlink may change between frames in the example of FIG. 6. For example, the number of subcarriers used for uplink transmissions in frame 608 may be different than the number of subcarriers used for uplink transmissions in frame 610. Similarly, the number of subcarriers used for downlink transmissions may vary between frames.

In this manner, time division techniques may be used in addition to techniques described herein for intermingling uplink and downlink transmissions across a frequency band (e.g., using different subbands). Baseband radios described herein, such as the baseband radio 124 and baseband radio 126 may provide uplink and/or downlink transmissions in the particular subcarriers to achieve the frames described herein, such as the frames shown in FIG. 6. The baseband radios may accordingly be used to implement time division techniques.

Examples of duplexing techniques described herein including intermingling uplink and downlink transmissions among subcarriers within a carrier band may have some advantages. In some examples, since there is no overlap between the UL and DL in frequency, base station to base station and user device to user device interference may be reduced and/or eliminated. In some examples, since each subcarrier in a downlink transmission has at least one neighboring subcarrier in the uplink transmission (and vice-versa), the beamforming weights used for receive beamforming can be applied immediately and/or without re-calculating weights to the Tx side as well, eliminating and/or reducing Tx weight delay. In some examples, since both transmit and receive occur simultaneously, overhead associated with TTG/RTG may be reduced and/or eliminated. Furthermore, the beamformer may not need to be reset at the beginning of each frame since it is taking place continuously and incrementally. Therefore, some of the training overhead (e.g., reference or training symbols) may also be reduced.

Examples of systems described herein may include cancellation circuitry. For example, the transceivers of FIG. 1 are illustrated as including cancellation circuitry. When transmit signals are provided on a same frequency and time as receive signals (e.g., full duplex transmission), a strong transmit signal may leak into the receiver (e.g., self-interference). While the transmitted signal is known a priori, and in theory can be subtracted from the received signal, this may be unpractical in many examples. For example, the difference in power between the transmit and receive signals (usually in excess of 100 dB) may be beyond the dynamic range of any practical receiver. Further, the transmit signal may also have noise and distortion, which either cannot be predicted (noise) or may need complex non-linear processing (distortion).

Figure 4:
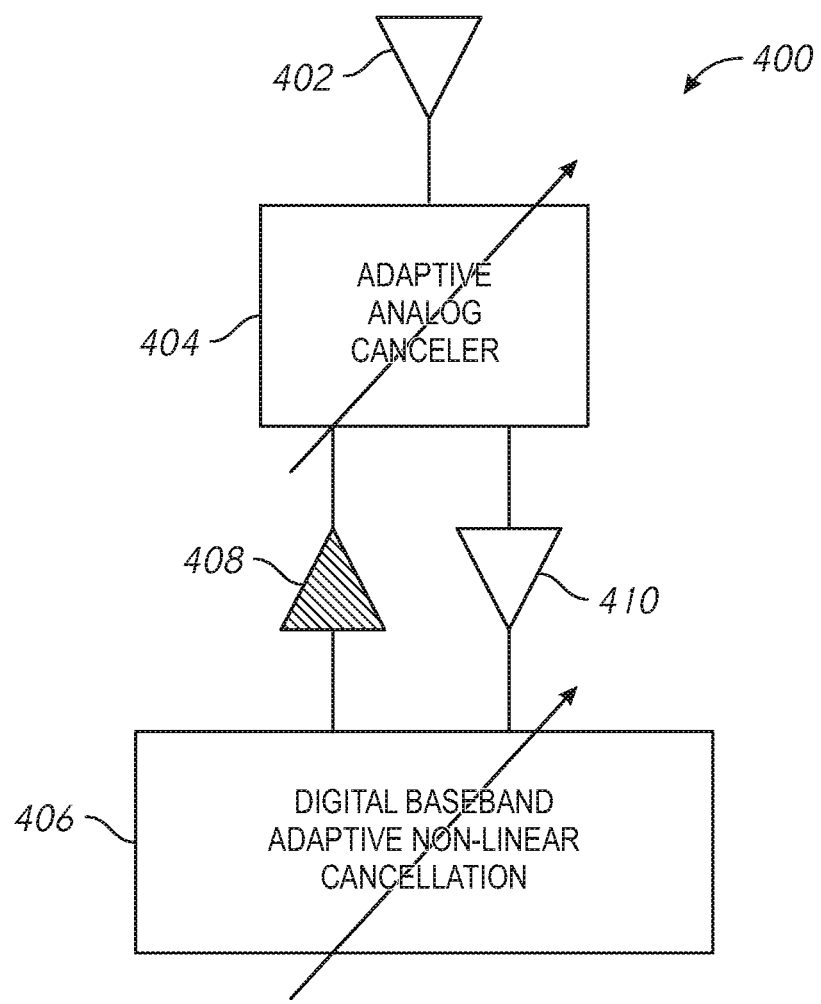
FIG. 4 is a schematic illustration of a transceiver arranged in accordance with examples described herein.

Self-interference cancellation techniques, devices, and/or circuitry may be used to address these interference concerns in some examples. FIG. 4 is a schematic illustration of a transceiver arranged in accordance with examples described herein. The transceiver 400 may be used to implement, for example, transceiver with cancellation 114, transceiver with cancellation 116, and/or transceiver with cancellation 118 of FIG. 1. The transceiver 400 includes antenna 402, transmitter 408, receiver 410, interference cancellation circuitry 404, and interference cancellation circuitry 406. The interference cancellation circuitry 404 may provide analog cancellation based on signals at an input of the receiver 410 and an output of the transmitter 408. The interference cancellation circuitry 406 may provide digital cancellation based on signals at an output of the receiver 410 and an input of the transmitter 408. The components shown in FIG. 4 are by way of example. Additional, fewer, and/or different components may be used in other examples.

The transmitter 408 may be implemented, using, for example, a power amplifier and/or other transmit circuitry or components. The receiver 410 may be implemented using, for example, a low noise amplifier and/or other receive circuitry or components.

The interference cancellation circuitry 404 may provide cancellation in the analog (e.g., RF) domain. Generally, the purpose of such analog cancellation is to knock down the noise and distortion components of the self-interference near or below the receiver noise floor, and knock the signal component into the linear region of the receiver. The amount of attenuation which may be used to achieve this goal is usually of the order of 60-70 dB in some examples.

The interference cancellation circuitry 406 may provide cancellation in the digital base band domain. The interference cancellation circuitry 406 may subtract what remains of the transmit signal after cancellation by the analog interference cancellation circuitry 404 using an adaptive non-linear filter at the digital baseband stage. The amount of cancellation provided in the digital domain varies, but may be between 60-70 dB in some examples. Both digital and analog cancellation circuitry may need to be adapted frequently to account for changes in amplifier/antenna characteristics.

Figure 5:
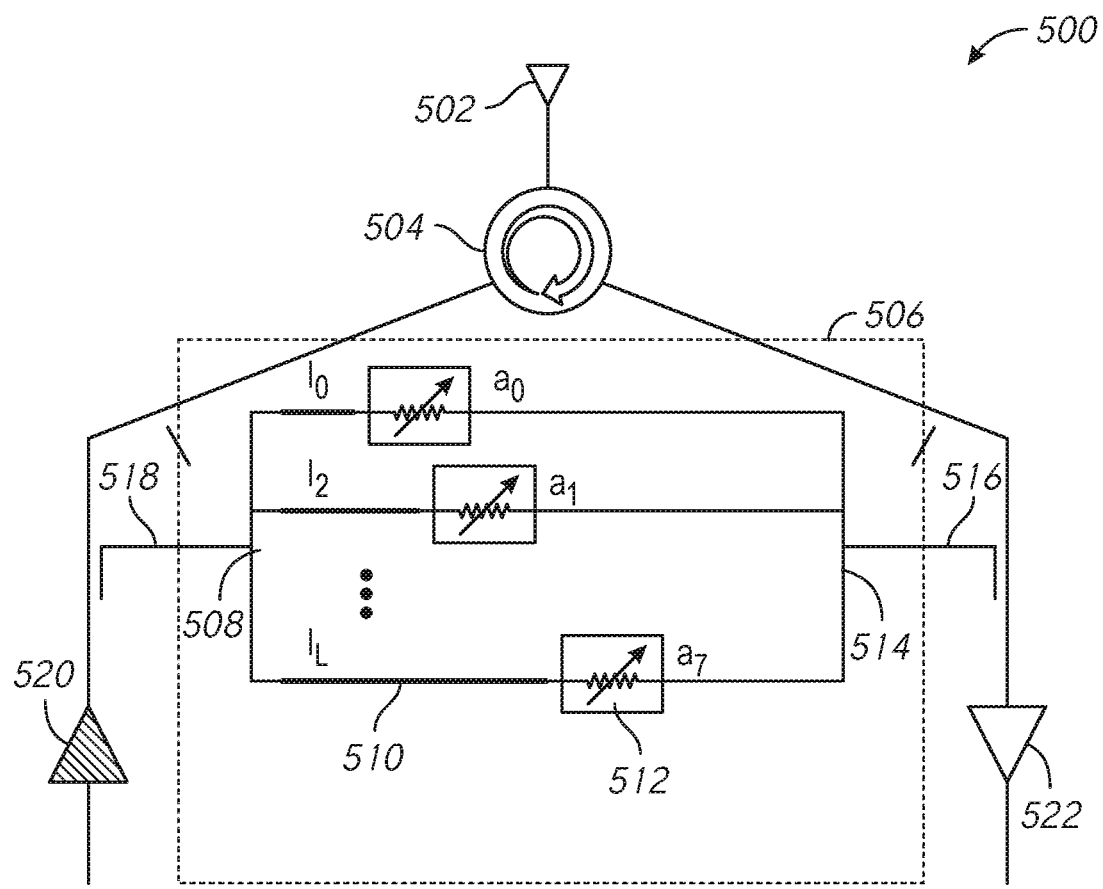
FIG. 5 is a schematic illustration of a transceiver arranged in accordance with examples described herein.

FIG. 5 is a schematic illustration of a transceiver arranged in accordance with examples described herein. The transceiver 500 may be used to implement the transceiver with cancellation 114, transceiver with cancellation 116, and/or transceiver with cancellation 118 of FIG. 1. The transceiver 500 may be used to implement the transceiver 400 of FIG. 4 (e.g., the analog interference cancellation circuitry 404 of FIG. 4). The transceiver 500 may include antenna 502, circulator 504, delay line canceller 506, splitter 508, transmission line 510, attenuator 512, combiner 514, coupler 516, coupler 518, transmitter 520, and receiver 522. The antenna 502 is connected to transmitter 520 and receiver 522 by circulator 504. The coupler 518 couples the transmitter 520 to the delay line canceller 506. The coupler 516 coupled the receiver 522 to the delay line canceller 506. The delay line canceller 506 may include multiple delay lines, such as a delay line having transmission line 510 and attenuator 512, which may be adjustable. The components shown in FIG. 5 are by way of example only. Additional, fewer, and/or different components may be used in other examples, and different arrangements of components may be used.

The overall analog attenuation is achieved by the transceiver 500 in two stages. The first stage includes circulator 504. The circulator 504 may provide isolation between the transmitter 520 and receiver 522—between 10-15 dB in some examples, which may have minimum insertion loss. The second stage of cancellation is an adaptive RF canceler. In this stage, the transmit signal at the output of the transmitter (e.g., at the output of a power amplifier) is coupled (e.g. using a directional coupler 518) to delay line canceller 506. The delay line canceller 506 includes a splitter 508, which may split the coupled signal to several transmission lines of varying lengths, including transmission line 510. The signal through each transmission line goes through a variable attenuator, such as attenuator 512, which may be programmed independently (e.g., set with variable attenuation). The signals from the different transmission lines are then combined at combiner 514 and coupled (e.g., at coupler 516) back to an input of the receiver 522 (e.g., before the low noise amplifier (LNA)).

The attenuation levels of the variable attenuators correspond with coefficients of an analog filter provided by the cancellation circuitry. These coefficients may be adapted (e.g. during a training process under the control of one or more processors or other control circuitry) until the coupled signal into the receiver 522 approximates the transmitted signal as close as possible with opposite polarity (phase). The use of delay lines may provide wideband signal cancellation. The adaptive analog filter can achieve up to 50-55 dB additional suppression in some examples. The noise and distortion components get canceled as well since the canceler subtracts a copy of the signal coming directly from the transmitter (as opposed to generating a new copy from scratch).

Accordingly, self-interference techniques and/or circuits, such as those shown in FIG. 4 and FIG. 5 may allow for simultaneously transmitting and receiving on the same frequency band in some examples, known as full duplexing. More generally, use of self-interference cancellation may allow any UL/DL frequency band configuration/overlap. For example, the downlink and uplink can be on adjacent channels. So the self-interference cancellation circuit may act like a universal diplexer that makes full duplex frequency allocation flexible. The term any division duplexing or ADD may be used to describe this wide range of possibilities.

Implementation of full duplexing, however, poses a number of challenges. Cost is a big factor in determining the success of any technology. The circuit use for analog cancellation (e.g., as shown in an example of FIG. 5) is still bulky and difficult to integrate into transceivers. This may be a bigger issue when antenna arrays/beamforming and MIMO technology are used. In this case, it may not be sufficient to cancel self-interference, but the cross-interference between antennas may need to be canceled as well, which may further complicate matters and add to the cost. Multi-antenna technology is advantageous as an economically feasible and effective way to scale network capacity by orders of magnitude (e.g., compared to full duplexing, which improves capacity by a factor of 2× at best). Therefore, if full duplexing cannot be integrated into multi-antenna technology in an economically scalable and feasible manner, it will have difficult time achieving mass adoption. Second, full duplexing may not be currently compatible with existing wireless protocols (e.g. LTE, WiMAX, WiFi). A lot of changes need to be made to standards in order to ensure backwards compatibility. Third, there may be other system level issues that need to be addressed as well to implement full duplexing.

Consider, for example, a simple cellular network. In a cellular system implementing frequency division and/or time division duplexing, the DL and UL are on separate channels. In this setup, user devices (e.g. smart phones) generally only interfere with one another at the base station, where multiple transmit signals may arrive at the base station (BS) in a same frequency and/or time slot from multiple user devices. This can be in the form of intra-cell interference or intercell interference. Similarly, in such an examples system, the base stations generally only interfere with one another at the user devices (e.g., one user device may receive interference from other base stations transmitting at a same frequency and/or time slot).

In a network with full duplexing (ZDD), both clients and base stations may be transmitting and receiving simultaneously on both channels. When ZDD is used, the amount of interference may be doubled. The BSs will experience interference not only from clients, but also from other BSs. For example, when a base station attempts to receive at a particular time or frequency slot in ZDD, it may have interference from both other base stations and other user devices transmitting in that particular time and/or frequency slot. Similarly, clients will start experiencing additional interference from other clients. The situation becomes even further complicated when multiple BSs are involved. Since BSs generally transmit at much higher power levels than clients, and have much better propagation characteristics towards other BSs (since both are usually sitting on high points), the DL of a neighboring BS can completely overwhelm the UL of associated clients in some examples. The same thing may happen at clients that are located near one another. This interference is difficult to avoid since each BS is surrounded by multiple BSs. A BS can employ multi-antenna beamforming to cancel interference from neighboring BSs. However, the presence of multiple antennas may complicate the implementation of self-interference cancellation. Furthermore, a multi-antenna BS can potentially yield more than 2× increase in capacity in a conventional TDD or FDD system (especially TDD), which may defeat the main purpose of using full duplexing.

Note that, if full duplexing were to be implemented in a typical TDD or FDD setting, it may be necessary to have a number of cancellation circuits which may grow on the order of $N^2$, where N is the number of antennas. For example, one antenna may need a cancellation circuit (such as shown in FIG. 5) to cancel interference from each of the other antennas on the device and/or in the system. The complexity of such an interference scheme may not be desirable.

WiFi is another popular wireless system that is different from cellular in the way the protocols operate. Since WiFi operates in unlicensed spectrum, and there are no centralized operators, devices may cooperate with another in sharing the spectrum. For this reason, WiFi devices may rely on carrier sensing and collision detection/avoidance, as opposed to centralized scheduling, which is common in cellular systems. Carrier sensing ensures that only a single link is using the channel as any given time in a given "neighborhood". Once a link relinquishes the channel, other links are free to compete for it. The fact that only a single link is using the channel at any given time avoids the interference problems associated with cellular and makes it friendlier to full duplexing. In the case of WiFi, the change may be more straightforward. When a link acquires the channel, instead of one end transmitting while the other receives, both are allowed to transmit. However, since WiFi is statistical in nature, the probability that both ends of the link have large amounts data to transmit simultaneously is low. So even though the UL maybe available, the likelihood of it being utilized is low. Therefore, the overall increase in capacity ends up being less than 2×.

Despite those challenges, there are some niche applications for full duplexing, where full duplexing may be readily integrated. Fixed LOS microwave and mm-Wave P2P links may utilize full duplexing, for example. These links use very narrow beams (with static antennas) at both ends, which takes care of the interference. Standards compliance is not a major issue for P2P links. Also, these links are not very price sensitive since they do not sit on consumer premises. So the cost of the self-interference cancellation circuit becomes less of an issue.

Also, in most applications where LOS microwave P2P links are used, the links are usually active in both directions near peak capacity most of the time (unlike WiFi).

Even though several techniques have been invented that allow the transmitter and receiver to operate simultaneously (e.g., without the transmitter overwhelming the receiver), there remain challenges which may limit the applicability of these techniques. For example, when every node in the network transmits and receives at the same time and frequency, the interference level rises significantly. In the conventional paradigm (e.g., TDD, FDD, dual-TDD), the transmission of base stations (nodes that are connected directly to the core of the network) may only interfere with the reception of user devices (e.g., nodes that are connected at the consumer premise) and vice versa. With full duplexing, the base station transmission will also interfere with the reception of other base stations, and the user device transmission will interfere with the reception of other user devices. This type of interference can be a lot more severe since user devices can be in close proximity of one another and base stations usually have great visibility to one another. Further, full duplexing may not scale very well in multi-antenna systems. In addition to self-interference, there will also be mutual interference from neighboring antennas that may need to be canceled as well. Despite these drawbacks, full duplexing (or zero-division duplexing/ZDD) is only a subset of a bigger class of duplexing techniques known as any division duplexing (ADD). Under ADD, the DL and UL can occur at the same time with no overlap, full overlap, or partial overlap in frequency. Full overlap will result in full duplexing. However, by relaxing the full-overlap requirement, the advantages of ZDD with respect to Tx beamforming (e.g., low delay/weight staleness) can be retained, while alleviating challenges described herein, albeit at lower spectral efficiency and potentially lower available TBP since only half of the band is used.

Examples of techniques described herein which intermingle uplink and downlink transmissions among subcarriers in a carrier band (e.g., multicarrier-FDD) may be used to simplify the self-interference cancellation hardware used.

As described herein, each antenna in an antenna array may generally be provided with circuitry to cancel its own self-interference as well as interference coming from other transmitters in the array (e.g., mutual interference). The interference cancellation generally takes place in two stages: analog and digital, as shown for example in FIG. 4. The analog/RF component may be expensive from a hardware standpoint, while the digital component may be expensive from the software (and digital hardware) standpoint. The complexity can grow quadratically with the number of antennas.

In some examples described herein, the spacing between antennas in the antenna array (e.g., spacing between antenna 102, antenna 106, and antenna 110) may be selected to reduce and/or eliminate a need for analog mutual interference cancellation. For example, antenna 106 may be positioned a distance from the antenna 110 and the antenna 102 such that the transmit signals transmitted by antenna 110 and antenna 102 do not interfere and/or contribute only negligible interference to signals incident on the antenna 106. All antennas in an array used in FIG. 1 or other examples described herein may be so positioned in some examples.

Accordingly, cancellation circuitry provided in FIG. 1 (e.g., cancellation circuitry provided in transceiver with cancellation 116) may not include analog cancellation circuitry in some examples. The transceiver with cancellation 116 may for example include transceiver 400 of FIG. 4 without analog interference cancellation circuitry 404. The transceiver with cancellation 116 may include the interference cancellation circuitry 406 of FIG. 4 which may be used to cancel self-interference (e.g., interference generated due to transmissions of the same antenna used to receive). In this manner, the number of cancellation circuits used may grow only with the order of N (e.g., each antenna having only cancellation circuitry for cancelling interference generated by that same antenna).

In some examples of antenna arrays, some of the antennas in the array may be provided with analog cancellation circuitry while others may not be. For example, some antennas may be spaced sufficiently close together that analog cancellation circuitry is desirable and may be provided. Other antennas may be sufficiently distant that analog cancellation circuitry is not provided. For example, the antenna 102 and antenna 106 may be sufficiently close that each may be provided with analog cancellation circuitry (e.g., in transceiver with cancellation 114 and transceiver with cancellation 116) to cancel signal contributions incident from the other antenna. However, the antenna 110 may be sufficiently distant from the antenna 102 and the antenna 106 that analog cancellation circuitry may not be provided in transceiver with cancellation 114 and transceiver with cancellation 116 to address transmitted signals from the antenna 110. Generally, then, analog cancellation circuitry for a particular antenna may be provided to cancel transmitted signals originating from antennas within a threshold distance of the particular antenna. The cancellation circuitry may scale in accordance with the number of antennas within that distance (e.g., linearly with the number of antennas N), but it may still be less than an order $N^2$.

Moreover, since transmit signals and receive signals are present on different frequency subcarriers, there may be a reduced and/or eliminated need for digital cancellation circuitry (e.g., digital interference cancellation circuitry 406 of FIG. 4). In some examples, all transmit subcarriers may be different than all receive subcarriers, and digital interference cancellation circuitry may not be required. For example, the transceiver with cancellation 114, transceiver with cancellation 116, and/or transceiver with cancellation 118 may not include interference cancellation circuitry 406 of FIG. 4 in some examples. In some examples, some transmit subcarriers may partially and/or wholly overlap with some of the receive subcarriers. Accordingly, digital cancellation circuitry may be provided (e.g., in transceiver with cancellation 114, transceiver with cancellation 116, and/or transceiver with cancellation 118 of FIG. 1) to address the areas of frequency overlap.

From the foregoing it will be appreciated that, although specific embodiments have been described herein for purposes of illustration, various modifications may be made while remaining with the scope of the claimed technology.

Examples described herein may refer to various components as "coupled" or "connected" or signals as being "provided to" or "received from" certain components. It is to be understood that in some examples the components are directly coupled or connected to one to another, while in other examples the components are coupled or connected with intervening components disposed between them. Similarly, signal may be provided directly to and/or received directly from the recited components without intervening components, but also may be provided to and/or received from the certain components through intervening components.

What is claimed is:

1. A method comprising:
   transmitting transmit signals to a first communication device, using a second communication device, in one or more first subcarrier frequencies; and
   receiving receive signals at the second communication device, from the first communication device, in one or more second subcarrier frequencies; and
   wherein the one or more first subcarrier frequencies are each different than each of the one or more second subcarrier frequencies, wherein the one or more first subcarriers is a neighboring subcarrier to the one or more second subcarriers, wherein the one or more first subcarrier frequencies and the one or more second subcarrier frequencies are located within a carrier band having a same estimate of channel state information, and wherein said transmitting and said receiving occur at least in part temporally simultaneously.

2. The method of claim 1, wherein said transmit signals comprise an uplink transmission and wherein said receive signals comprise a downlink transmission.

3. The method of claim 1, wherein the first communication device comprises a wireless base station, and wherein the second communication device comprises a user device.

4. The method of claim 1, wherein said receiving the receive signals comprises calculating weights used to combine information from multiple antennas, and wherein the weights are associated, at least in part, with an estimate of channel state information between the first communication device and the second communication device.

5. The method of claim 4, wherein said transmitting the transmit signals comprises using the weights to form a beam using the multiple antennas.

6. The method of claim 1, wherein a number of the one or more first subcarrier frequencies is different than a number of the one or more second subcarrier frequencies.

7. The method of claim 1, wherein said transmitting the transmit signals comprises encoding data for the transmit signals in accordance with orthogonal frequency division multiplexing (OFDM) using the first subcarrier frequencies.

8. The method of claim 1, wherein said receiving the receive signals comprises at least partially cancelling interference at each antenna used to receive the receive signals due to a portion of the transmit signals provided by that same antenna.

9. The method of claim 8, wherein said receiving the receive signals comprises at least partially cancelling interference at each antenna used to receive the receive signals due to a portion of the transmit signals provided by that same antenna and other antennas used to provide the transmit signals.

10. The method of claim 1, wherein said transmitting the transmit signals and said receiving the receive signals further comprise using time division duplexing techniques.

11. A system comprising:
an antenna array comprising a plurality of antennas;
respective transceivers in communication with each of the plurality of antennas; and
a weight processor in communication with the respective transceivers and configured to calculate weights for the plurality of antennas based on receive signals received at the plurality of antennas, wherein the receive signals are received in first subcarrier frequencies; and
wherein the respective transceivers are configured to use the weights to transmit signals using the antenna array in a second subcarrier frequencies, wherein the first subcarrier frequencies are each different than the second subcarrier frequencies.

12. The system of claim 11, wherein the plurality of antennas are distributed in an environment to form a distributed antenna system.

13. The system of claim 11, wherein the plurality of antennas are incorporated in a single communication device.

14. The system of claim 11, wherein the receive signals are configured to be received from and the transmit signals are configured to be provided to a communication device, and wherein the weights are associated with an estimate of channel state information between the communication device and the antenna array.

15. The system of claim 14, wherein the system comprises a user device and the communication device comprises a base station.

16. The system of claim 11, wherein a number of the first subcarrier frequencies is different than a number of the second subcarrier frequencies.

17. The system of claim 11, wherein the first subcarrier frequencies and the second subcarrier frequencies are located within a carrier band having a same estimate of channel state information.

18. The system of claim 11, further comprising a beamforming network and a baseband radio configured to encode data for the transmit signals in accordance with orthogonal frequency division multiplexing (OFDM) using the second subcarrier frequencies.

19. The system of claim 18, wherein the beamforming network and the baseband radio are further configured to encode date for the transmit signals using time division duplexing techniques.

20. The system of claim 11, further comprising interference cancellation circuitry included in the respective transceivers, the interference cancellation circuitry configured to at least partially cancel interference at each antenna used to receive the receive signals due to a portion of the transmit signals provided by that same antenna.

21. The system of claim 20, wherein the interference cancellation circuitry is further configured to at least partially cancel interference at each antenna used to receive the receive signals due to other antennas used to provide the transmit signals.

* * * * *